No. 745,754. PATENTED DEC. 1, 1903.
S. H. ADAMS.
FILTER CONSTRUCTION AND APPARATUS CONNECTED THEREWITH.
APPLICATION FILED JULY 6, 1903.
NO MODEL.
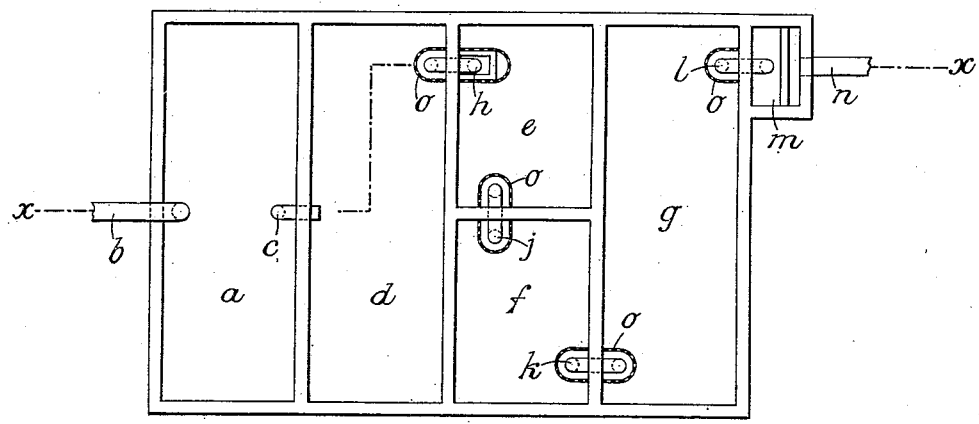
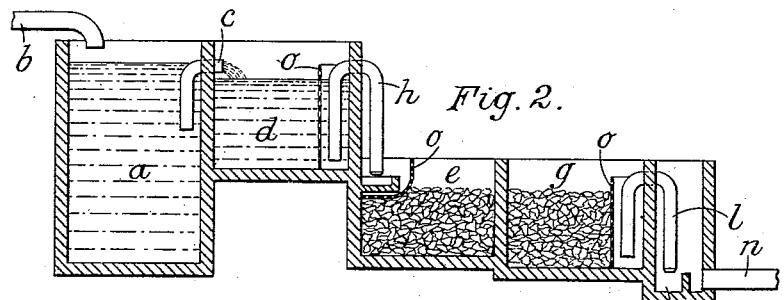
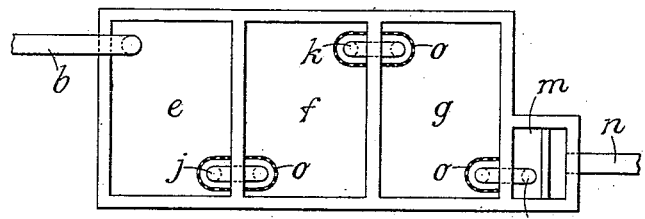
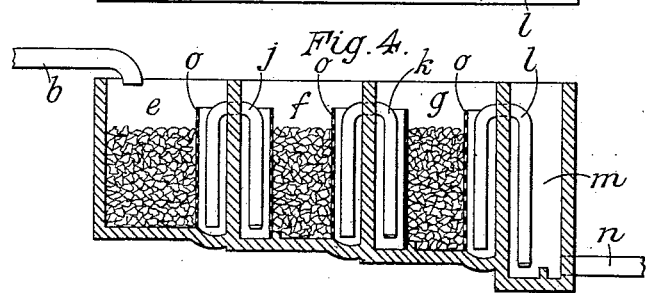

No. 745,754. Patented December 1, 1903.

UNITED STATES PATENT OFFICE.

SAMUEL H. ADAMS, OF YORK, ENGLAND.

FILTER CONSTRUCTION AND APPARATUS CONNECTED THEREWITH.

SPECIFICATION forming part of Letters Patent No. 745,754, dated December 1, 1903.

Application filed July 6, 1903. Serial No. 164,401. (No model.)

*To all whom it may concern:*

Be it known that I, SAMUEL HENRY ADAMS, a subject of the King of Great Britain, residing at York, England, have invented certain new and useful Improvements in Filter Construction and Apparatus Connected Therewith, of which the following is a specification.

In ordinary filters, whether for clear water or sewage, the liquid passes directly through the filter, either upward or downward, and if a greater degree of purification is required than can be attained by one passage through the filter it is necessary to pass the liquid through another filter at a lower level. Thus depth is essential. In order to obtain purification without requiring great depth, I according to my invention provide a series of filters or receptacles for filtering material arranged substantially on the same level, and I arrange that the liquid to be purified is passed from one to another through the series of filters by means of siphonic apparatus, the filters being filled successively. The liquid is discharged from the last filter through a siphon, and in so discharging the liquid is drawn off from the whole of the connected filters or divisions. Preferably the outlet of the last filter is at such a level that the contents will flow out by gravity. The feed-pipe may discharge directly into the first filter or division or it may deliver into a collecting-tank, whence the liquid passes to the first filter.

Referring to the drawings, Figure 1 is a plan of an arrangement of filters and siphons according to my invention. Fig. 2 is a vertical longitudinal section thereof, taken on the line *x x*, Fig. 1. Fig. 3 is a plan, and Fig. 4 a longitudinal section, illustrating a small installation in which the collecting-tank is dispensed with.

Like letters of reference denote corresponding parts in the several figures.

Referring to Figs. 1 and 2, $a$ is a liquefying-tank into which the sewage first flows from the feed-pipe $b$ and from which it passes by means of a pipe $c$ to a collecting-tank $d$. $e\,f\,g$ are filters. $h$ is a siphon for feeding the filter $e$ from the tank $d$. $j$ is a siphon connecting the filters $e\,f$. $k$ is a siphon connecting the filters $f\,g$, and $l$ is a discharging-siphon emptying into a chamber $m$, furnished with an outlet $n$. The several filters are filled with a suitable filtering material, and a screen $o$ is provided around each siphon to prevent the entrance of filtering material into the siphons.

The action is as follows: When the liquid rises in the tank $d$ to a sufficient height, it forces the siphon $h$ and passes into the filter $e$. The collecting-tank $d$ then fills again and again discharges into the filter $e$, and in so doing fills the second filter $f$ through the siphon $j$. The next discharge from the tank $d$ fills the filter $g$ and starts the siphon $l$, whereupon the whole of the contents of the three filters is discharged into the chamber $m$ and out by the outlet $n$. The operation of refilling the filters then begins again, and in this way it is seen that without substantially increasing the depth through which the liquid falls in passing through the filters I am enabled to filter the liquid several times before passing it to the outlet, thus securing any desired degree of purification. There may be more than three filters in the series, if desired.

I arrange the levels of each filter or division so that the siphons in each may have their outlets exposed after a discharge in order that they may break action when empty.

If desired, the collecting-tank $d$ may be dispensed with, in which case the filters are fed from the liquefying-tank $a$ or in some cases direct from the feed-pipe $b$.

Figs. 3 and 4 illustrate a small installation in which there is neither liquefying-tank nor collecting-tank, but in which the feed-pipe $b$ discharges directly into the first filter. The action is the same as in the apparatus shown in Figs. 1 and 2 and need not be further described except to remark that the supply is delivered more or less continuously and not in sudden flushes.

What I claim is—

1. A series of filters arranged at substantially the same level, siphon-pipes connecting said filters, a filling-siphon for filling the series of filters by a succession of operations, and a discharging-siphon for discharging the whole of the filters simultaneously.

2. A series of filters arranged at substantially the same level, siphon-pipes connecting adjacent filters, a collecting-tank, a siphon for discharging the contents of the collecting-tank into the filters each time said tank fills, and a discharging-siphon for discharging the whole of the filters simultaneously.

In testimony whereof I have hereunto set my hand in presence of two subscribing witnesses.

S. H. ADAMS.

Witnesses:
   JAMES CORMACK,
   DANIEL GREEN.